United States Patent
Katou et al.

(10) Patent No.: US 6,585,074 B2
(45) Date of Patent: Jul. 1, 2003

(54) VEHICLE STEERING SYSTEM

(75) Inventors: Takafumi Katou, Wako (JP);
Yoshimitsu Akuta, Wako (JP); Kazuo Matsuura, Wako (JP); Keiichi Takikawa, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/998,472

(22) Filed: Nov. 29, 2001

(65) Prior Publication Data

US 2002/0063012 A1 May 30, 2002

(30) Foreign Application Priority Data

Nov. 30, 2000 (JP) .......................... 2000-365530

(51) Int. Cl.[7] .............................. B62D 5/06; B62D 5/04; B62D 5/02; F16H 1/04
(52) U.S. Cl. ...................... 180/428; 180/444; 180/448; 74/422; 74/498
(58) Field of Search ................. 180/400, 427, 180/428, 444, 447, 448; 74/422, 498

(56) References Cited

U.S. PATENT DOCUMENTS 5,687,811 A * 11/1997 Shimizu .................. 180/447
6,442,992 B2 * 9/2002 Tsubouchi et al. ....... 72/370.21

FOREIGN PATENT DOCUMENTS

JP     2501606     5/1989

* cited by examiner

*Primary Examiner*—Kevin Hurley
*Assistant Examiner*—Matthew Luby
(74) *Attorney, Agent, or Firm*—Merchant & Gould, P.C.

(57) ABSTRACT

A vehicle steering system includes a rack and pinion mechanism having a pinion functionally coupled to a steering wheel and a rack meshing with the pinion and functionally coupled to steerable wheels and a mechanism for displacing the rack in the axial direction thereof to steer the steerable wheels independently of steering operation initiated by the steering wheel. The rack and pinion mechanism comprises a variable gear ratio rack and pinion mechanism having a variable gear ratio, which is the lowest when the steering wheel is in a neutral position and becomes higher as the steering angle of the steering wheel becomes large.

10 Claims, 14 Drawing Sheets

VEHICLE STEERING SYSTEM

FIELD OF THE INVENTION

The present invention relates to a vehicle steering system capable of controlling the steered angle or the steerable wheels independently of steering operation of the driver.

BACKGROUND OP THE INVENTION

While the vehicle is running, there occurs frequent changes in external factors such as road surface conditions, wind direction and so, which may change the vehicle running and steering conditions abruptly. The driver continues to manipulate the steering wheel in an appropriate manner so as to maintain a stable running condition. For instance, when the vehicle is running at high speeds, lateral wind force acting on one side of the vehicle may obstruct smooth straight ahead running of the vehicle. The driver should endeavor to keep the vehicle running straight ahead against the lateral wind (external factor), which is tiresome.

In view of this, various attempts have been made in recent years to develop a steering system, which is capable of assisting the driver's vehicle maneuvering operation according to underlying vehicle running and steering conditions, thereby improving the control stability and maneuverability or the vehicle. One example of such improved steering systems is disclosed in Japanese Patent No. 2501606.

The disclosed steering system 300, as shown here in FIG. 11, includes a gear housing 303 connected via left and right links 302, 302 to a vehicle body 301 such that the gear housing 303 is displaceable in the widthwise direction of the vehicle body 301. The gear housing 303 is also supported by left and right elastic members 304, 304 on the vehicle body 301 such that the gear housing 303 is displaceable both in the radial direction and the widthwise direction thereof. The steering system 300 has an actuator 306 mounted to the vehicle body 301 via an elastic member 305. The actuator 308 has an actuating rod 307 connected to one end of an L-shaped arm 308, the other end of the arm being firmly connected to the gear housing 303.

The gear housing 303 contains within it a rack and pinion mechanism 311. The rack and pinion mechanism 311 has a pinion 315 connected to a steering wheel 312 via a steering shaft 313 and a set of shaft couplings 314, 314, and a rack 318 connected to steerable wheels (front wheels) 316, 316 via tie rods 317, 317.

With this arrangement, when the driver turns the steering wheel 312 in one direction, the steering system 300 operates to swivel the steerable wheels 316, 316 in the same direction via the rack and pinion mechanism 311. The same swivel motion of the steerable wheels 316, 316 can also occur when the actuator 306 operates to extend or contract its actuating rod 307 to move the gear housing 303 in a widthwise direction of the vehicle, thereby displacing the rack and pinion mechanism 311 as a whole in the same widthwise direction of the vehicle.

Here, the total amount of axial displacement (S30) of the rack 318 is represented by a combination or the amount of axial displacement (S31) of the rack 318 achieved by manual steering operation of the driver at the steering wheel 312 and the amount of axial displacement (S32) of the rack 318 achieved by operation of the actuator 306 (S30= S31±S32). This means that the actuator 306 can assist the manual steering operation. The actuator 306 can control the range of the steering ratio, which is represented by the ratio of the steering angle of the steering wheel 312 to the steered angle of the steerable wheels 316. The steering ratio is also called "steering angle ratio".

The maximum controlled variable achieved by the actuator 306, that is, the amount of maximum axial displacement (332) of the rack 318 achieved by the actuator 306, is determined depending on the stroke of the actuating rod 307 and the maximum range of displacement of the gear housing 303. Thus, the amount of axial displacement (S32) of the rack 308 achieved by the actuator 306 is limited to a certain range.

The rack and pinion mechanism 311 of the conventional steering system 300 has a fixed gear ratio (the number of full turns of the pinion 315 required to move the rack 318 all the way from left to right).

Due to the fixed gear ratio of the rack and pinion mechanism 311, the rack gain of the conventional steering system 300 is always constant regardless or the steering angle, as shown in FIG. 12A. The rack gain is represented by the amount of axial displacement (mm) of the rack achieved when the pinion (that is, the steering wheel) makes a single complete turn. The rack gain is also called "relative stroke". In the table shown in FIG. 12A, the y-axis represents the rack gain (mm/turn) and the x-axis the steering angle (degrees) of the steering wheel 312. The midpoint on the x-axis represents the neutral position of the steering wheel, at which the steering angle of the steering wheel is 0 degree. In each rotational sense, the steering system 300 has the same range of steering angles.

FIG. 12B is a graph showing a steering ratio characteristic curve St1 of the conventional steering system 300. The y-axis of the graph is the Steering ratio (deg/deg) and the x-Axis of the graph is the steering angle (deg) of the steering wheel. The smaller the steering ratio, the larger the steered angle of the steerable wheels in relation to the steering angle of the steering wheel. The steering ratio characteristic represented by the curve St1 depends solely on the amount of axial displacement of the rack achieved by manual steering operation of the driver in the absence of the assistance by the actuator.

Because of the constant or fixed rack gain shown in FIG. 12A, the steering ratio characteristic curve St1 shown in FIG. 12B indicates that the steering ratio is maximum when the steering wheel is in the neutral position, and it becomes small as the steering angle increases. When the steering wheel is in the neutral position, the steering ratio is R2. When the steering wheel is in its left or right end position of A maximum steering angle θ12, the steering ratio is R1, which is smaller than R2 (R1<R2).

Thus, a large (or high) steering ratio achieved in relation to a relatively small steering angle responds more slowly to the steering wheel, so that the steerable wheels are steered slowly. Conversely, a small (or low) steering ratio achieved in relation to a relatively large steering angle respond more quickly to the steering wheel, so that the steerable wheels are steered relatively quickly. This is due to a reason, which will be discussed below with reference to FIGS. 13A–13B and 14.

FIG. 13A is a diagrammatical plan view of a generally used vehicle steering system, and FIG. 13B is a diagrammatical side view of a steerable wheel of the steering system. In FIG. 13B, reference character Fr and Rr represent the forward direction and the backward direction, respectively, as viewed from the driver. As shown in FIG. 13A, the steering system 400 includes a rack and pinion mechanism 401 having a rack 402 connected at one end to one end or a tie rod 404 via a first universal joint 403, a knuckle arm 406 connected at one end to the other end of the tie rod 404 via a second universal joint 405, a kingpin 408 connected to the other end of the knuckle arm 404, and a steerable wheel 407 mounted to swivel or turn about the axis of the kingpin 408.

When a steering wheel 409 is manipulated or turned in one direction by the driver, manual steering force is transmitted successively through a pinion 401a and a rack gear 401 of the rack and pinion mechanism 401, the rack 402, the tie rod 404 and the knuckle arm 406 to the steerable wheel 407 so that the steerable wheel 407 is turned in the same direction as the steering wheel.

The steered angle of the steerable wheel 407 is a rotational angle about the axis of the kingpin 408 when viewed in the plan view. The three-dimensional length of the tie rod 404 is always constant. However, in FIG. 13A, the distance $\alpha 1$ from the axis of the kingpin 408 to the second universal joint 405 becomes small as the steered angle of the steerable wheel 407 approaches its maximum value. This is because when the steerable wheel 407 is viewed from an axial direction thereof, as shown in FIG. 13B, the axis of the kingpin 408 tilts toward the back with positive caster angle, and the knuckle arm 406 extends backward at right angles from the kingpin 409. The knuckle arm 406 turns about the kingpin 408 so that the length of the knuckle art 406 as measured in the plan view, that is, the distance $\alpha 1$ becomes small as the steerable wheel 407 approaches its lock position in each steering direction.

FIG. 14 is a plan view illustrative of the operation of the steering system shown in FIGS. 13A and 13B, the view showing the rack, tie rod and knuckle arm only. When the rack 402 is axially displaced in the arrowed direction, the first universal joint 403 located at the position P1 passes successively through the positions P1, P2, P3 and P4. These positions P1–P4 are equidistant from one another. The distance x1, x2, x3 between the adjacent positions P1, P2, P3 and P4 (corresponding to the amount of displacement of the rack 402 and the first universal joint 403) is proportional to the steering angle of the steering wheel 409 (FIG. 13A).

The second universal joint 405 and the knuckle arm 406 are angularly movable about the axis of the kingpin 408. When the rack 402 is axially displaced in the arrowed direction as previously described, the knuckle arm 406 located on the position Q1 moves consecutively from the positions Q1 to Q2, Q2 to Q3 and Q3 to Q4. For instance, when the first universal joint 403 moves from the position P1 to the position P2, the second universal joint 405 angularly moves from the position Q1 to the position Q2 through an angle of $\alpha 1$. Similarly, displacement of the first universal joint 403 from the position P2 to the position P3 causes the second universal joint 405 to angularly move from the position Q2 to the position Q3 through an angle of $\alpha 2$. Furthermore, displacement of the first universal joint 403 from the position P3 to the position P4 causes the second universal joint 405 to angularly move from the position Q3 to the position Q4 through an angle of $\alpha 3$.

The amount of displacement of the first universal joint 403 varies with uniform increments (x1=x2=x3), whereas the amount of angular displacement of the second universal joint 405 varies with non-uniform increments which become greater as the steerable wheel 407 approaches its steering lock position in either direction ($\alpha 1 < \alpha 2 < \alpha 3$). Thus, the steerable wheel 407 responds more quickly to the steering wheel as the steering angle of the steering wheel 409 (FIG. 13A) becomes large. By virtue of the steering geometry, the steering ratio characteristic curve St1 shown in FIG. 12B is obtained. In this connection, the length of the tie rod 46 as measured in the plan view also varied with the displacement of the rack 402; however, further description thereof is not necessary here.

Turning back to FIG. 12C, there is shown a steering ratio control characteristic curve which defines an optimum steering ratio control range A1 used for controlling the steering ratio by means of the actuator. In the table shown in FIG. 12C, the y-axis is the steering ratio (deg/deg) and the x-axis is the steering angle (deg) of the steering wheel. As indicated by hatching in FIG. 12C, the optimum steering radio control range A1 has a lower limit (control limit on the quick steer side) defined by the steering ratio characteristic curve St1 shown in FIG. 12B, and an upper limit (control limit on the slow steer side) defined by a controllable upper limit steering ratio characteristic curve St2. The optimum steering radio control range A1 has a width B1. The controllable upper limit steering ratio characteristic curve St2 is drawn on the basis of the total amount of displacement of the rack achieved with the assistance of control operation of the actuator. This curve St2 is offset upward from the steering ratio characteristic curve St1 (FIG. 12B) by a distance of the control ratio width B1.

The steering ratio control range A1 represents a range in which the steering ratio can be controlled according to the total amount of displacement (S30) of the rack which is obtained by subtracting the amount of displacement (S32) of the rack achieved by operation of the actuator, from the amount of displacement (S31) of the rack achieved by manual steering operation of the driver effected on the steering wheel (S30=S31−S32). Thus, with the steering ratio characteristic curve St1 used as a control reference on the quick steer side, the actuator can control the slow steer of the steerable wheel. Since S30=S31−S32 as discussed previously, this means that the amount of driver-dependent displacement S31 of the rack can be increased by subtracting an inverse of the amount of actuator-dependent displacement S32 or the rack from S31 (that is, by moving the rack by the actuator in a direction opposite to the direction intended by the steering wheel).

FIG. 15A is a graphical representation or the steered angle control characteristic of the conventional steering device. In this figure, the y-axis of the graph is the steered angle controlled variable (deg), and the x-axis of the graph is the steering angle (deg) of the steering wheel. The midpoint on the x-axis represents the neutral position of the steering wheel, at which the steering angle of the steering wheel is 0 degree. The steered angle controlled variable represents the controlled variable indicated in terms of the steered angle, which is used when controlling the steered angle of the steerable wheel by displacing the rack by the actuator.

As mentioned previously, the rack gain is always constant due to the fixed gear ratio of the rack and pinion mechanism, and the controlled variable that can be achieved by reducing amount of actuator-dependent axial displacement S32 of the rack is limited to a certain range. It is evident from FIG. 15A that when the steering angle of the steering wheel is θ11, the steered angle controlled variable becomes maximum with a value C1, and this maximum control variable C1 continues even with an increase in the steering angle until a steering angle θ12 is reached. This means that the steering angles in the range of θ11 to θ11 extending across the neutral position can only be effective to control the steered angle of the steerable wheels.

FIG. 15B is a graph showing a steering ratio control characteristic curve of the conventional steering system. The y-axis of the graph is the steering ratio (deg/deg) and the x-axis of the graph is the steering angle (deg) of the steering wheel. As shown in this figure, the steering ratio control characteristic curve defies a practical steering ratio control range A2, which is achieved when the range of steering ratio is controlled by the actuator. The practical steering ratio control range A2, like the optimum steering ratio control range A1 shown in FIG. 12C, is defined by the steering ratio characteristic curve St1 and the controllable upper limit steering ratio characteristic curve St2.

The steered angle control characteristic curve shown in FIG. 15A is used in combination with the steering ratio characteristic curve St1 so thereby draw or prepare the controllable upper limit steering ratio characteristic curve St2. Thus, the gradient of the controllable upper limit steering ratio characteristic curve St2 agrees with that of the steered angle control characteristic curve.

However, since the steered angle controlled variable is avail able only for the steering angles in the range of −C1 to +C1, no response can be obtained for steering angles in the range of θ11 to θ12. Due to the absence of the steered angle controlled variable, the practical steering ratio control range A2 is narrowed at a region corresponding to the relatively large steering angles θ11 to θ12. With this narrowing, an uncontrollable or inert area A3 is formed as indicated by broken lines in FIG. 15B. Due to the presence of the inert area A3, the practical steering ratio control range A2, as opposed to the optimum steering ratio control range A1 shown in FIG. 12C, cannot respond to the steering wheel over the fall range of steering angles.

Despite the limited steered angle controlled variable, a response to the full range of steering angles may be possible by narrowing the control ratio width B1 between the curves St1 and St2. However, this measure is not practical because the resulting controllable range of the steering ratios is very small.

SUMMARY OF THE INVENTION

It is accordingly an object of the present invention to provide a vehicle steering system, which is capable of controlling the steering ratio relative to a wider range or steering angles even when only a limited controlled variable is available.

To achieve the foregoing object, according to the present invention, there is provided a vehicle steering system comprising a steering wheels a rack and pinion mechanism having a pinion functionally coupled to the steering wheel and a rack meshing with the pinion and functionally coupled to steerable wheels; a housing accommodating within it the rack and pinion mechanism; and means for displacing the rack in the axial direction thereof to steer the steerable wheels independently of steering operation initiated by the steering wheel. The rack and pinion mechanism comprises a variable gear ratio rack and pinion mechanism having a variable gear ratio, which is the lowest when the steering wheel is in a neutral position and becomes higher as the steering angle of the steering wheel becomes large.

It is preferable that the rack has a first region generally corresponding in position to the neutral position of the steering wheel, and a second region extending contiguously from the first region in one direction along the axis of the rack, the first region has a fixed tooth pitch, and the second region has a variable tooth pitch smaller than the fixed pitch of the first region and reducing progressively in a direction from the first region toward an end of the second region opposite from the first region.

The rack may further have a third region extending from the end of the second region along the axis of the rack and generally corresponding in position to an end portion of an available range of the steering angles located remote from the neutral position, the third region having a fixed tooth pitch smaller than that of the second region.

In one preferred form of the present invention, the means for displacing the rack comprises: support means for supporting the housing on a vehicle body such that the housing is displaceable relative to the vehicle body in the widthwise direction of the vehicle body; and an actuator functionally coupled to the housing and operating to displace the housing relative to the vehicle body in the widthwise direction of the vehicle body, thereby causing the rack to move together with the housing in the width wise direction of the vehicle body. It is preferable that the support means comprises a link mechanism interconnecting the housing and the vehicle body such that the link mechanism together with the housing and a part of the vehicle body forms a quadric parallel linkage, and the actuator has an output portion operatively connected to the link mechanism.

The means for displacing the rack may further comprise a power transmitting mechanism disposed between the link mechanism and the actuator for transmitting power from the actuator to the link mechanism, the power transmission mechanism comprising a hypoid gear mechanism having a small gear connected to the output portion of the actuator and a large gear meshing with the small gear, and a drive link having one end pivotally connected to the link mechanism and the opposite end pivotally connected to the large gear in eccentric relation to the large gear.

In another preferred form of the prevent invention, the means for displacing the rack comprises: support means for supporting the pinion within the housing such that the pinion is displaceable in the axial direction of the rack; and an actuator functionally coupled to the pinion and operating to displace the pinion in the axial direction of the rack, thereby causing the rack to move together with the pinion in the axial direction thereof. It is preferable that the support means comprises a swing arm pivotally connected at one end to the housing and rotatably supporting thereon the pinion the swing arm extending transversely across the rack, and the actuator is mounted to the housing and has an output portion operatively connected to a free end of the swing arm.

The means for displacing the rack may further comprise a power transmitting mechanism disposed between the swing arm and the actuator for transmitting power from the actuator to the sting arm, the power transmission mechanism comprising a hypoid gear mechanism having a small gear connected to the output portion of the actuator and a large gear meshing with the small gear, and a drive link having on end pivotally connected to the free end of the swing arm and the opposite end pivotally connected to the large gear in eccentric relation to the large gear.

The swing arm may have a hollow structure having an internal space formed therein, the rack extending through the hollow space of the swing arm.

According to the present invention, the steerable wheels can be steered also by displacing the housing or the pinion relative to the vehicle body in the axial direction of the rack. With this arrangement, the total amount of axial displacement of the rack is represented by a combination of the amount of axial displacement of the rack achieved by manual steering operation effected at the steering wheel by the driver, and the amount of displacement of the rack achieved with the displacement of the housing or the pinion. Thus, by controlling the steered angle of the steerable wheels according to the displacement of the housing or the pinion, control of the steering ratio is possible. However, due to a limited displacement of the housing, a controllable range of the steering ratio in restricted too.

To deal with this problem, the rack and pinion mechanism of the present invention comprises a variable gear ratio type rack and pinion mechanism having a variable gear ratio, which is the lowest when the steering wheel is in a neutral position and becomes higher au the steering angle of the steering wheel becomes large. With the variable gear ratio type rack and pinion mechanism, the amount of axial displacement of the rack caused by one complete turn of the steering wheel is made to decrease inversely with the steering angle. Thus, the amount of displacement of the housing or pinion per single revolution of the steering wheel decreases, correspondingly. Accordingly, in spite of a limited amount of displacement of the housing or pinion being available, the steering ratio can be controlled extensively with respect to the steering angle.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
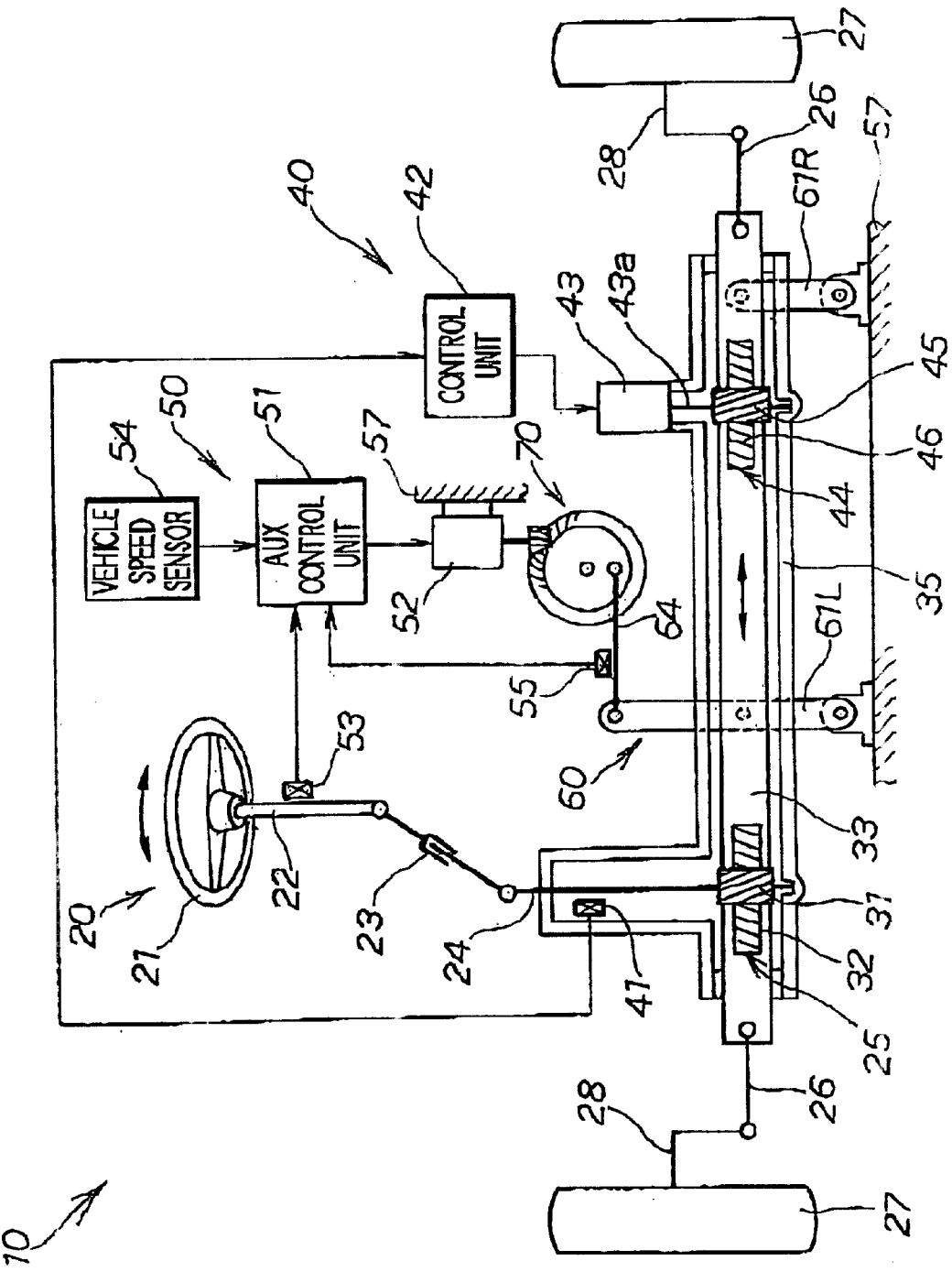
FIG. 1 is a schematic view showing the general arrangement of a vehicle steering system according to a first embodiment of the present invention.

Referring now to the drawings and FIG. 1 in particular, there is shown the general arrangement of a vehicle steering system 10 according to a first embodiment of the present invention. The vehicle steering system 10 generally comprises a steering system 20 which leads from a steering wheel 21 of a vehicle to steerable wheels (front wheels) 27, 27 of the vehicle, a torque assist mechanism 40 which applies an assist torque to the steering system 20, and an auxiliary steering mechanism 50 which can control steered angle of the steerable wheels 27, 27 independently of manual steering operation effected at the steering wheel 21 by the driver. The vehicle steering system 10 in of the so-called "and takeoff" type constructed such that a steering torque can be taken out from opposite ends of a rack 33.

The steering system 20 includes a steering shaft 22 connected at one end to the steering wheel 21, a pinion shaft 24 connected at one end to the other end of the steering shaft 22 via a universal joint mechanism 23, and a first rack and pinion mechanism 25 functionally coupled to the other end of the pinion shaft 24 and functionally coupled to the steerable wheels 27, 27 via left and right tie rods 26, 26. Reference numeral 28 denotes left and right knuckle arms interconnecting the respective tie rods 26 to the corresponding steerable wheels 27.

The first rack and pinion mechanism 25 has a first pinion 31 mounted to an end of the pinion shaft 24, and a first rack 33 with rack teeth 32 meshing with the first pinion 31, the rack 33 extending in the widthwise direction of a vehicle. The first rack and pinion mechanism 25 is accommodated in a gear case of housing 35. Thus, the first pinion 31 of the first rack and pinion mechanism 25 is functionally coupled to the steering wheel 21, and the first rack 33 of the first rack and pinion mechanism 25 is functionally coupled to the steerable wheels 27. The housing 35 holds therein the first rack and pinion mechanism 25 in such a manner that the pinion shaft 24 is rotatable about its own axis but is not movable in the axial direction thereof, and the rack 33 is slidably movable in the axial direction thereof. Thus, the housing 35 form a container or casing elongated in the widthwise direction of the vehicle.

The universal joint mechanism 23 permits the rack 33 to displace in the axial direction thereof. This mechanism also serves to transmit rotational torque of the steering wheel to the pinion shaft 24 and is expandable in the axial direction thereof.

The torque assist mechanism 40 includes a steering torque sensor 41 for detecting a steering torque of the steering system which is generated from the steering wheel 21, a control unit 42 which generates a control signal on the basis of an output signal from the steering torque sensor 41, an electric motor 43 which produces, on the basis of the control signal, an assisting torque proportional to the steering torque, and a second rack and pinion mechanism 44 functionally coupled in driven relation to the electric motor 43. The steering torque sensor 41 and the electric motor 43 are mounted to the housing 35.

The second rack and pinion mechanism 44 is composed of a second pinion 45 mounted to an output shaft 43a of the electric motor 43, and second rack teeth 46 meshing with the second pinion 45. The second rack teeth 46 are formed on the first rack 33. The rack 33 is used commonly for both first and second rack and pinion mechanisms 25 and 44.

With the vehicle steering system 10 thus constructed, a steering torque generated when the steering wheel 21 is turned by the driver is transmitted through the pinion shaft 24 and the first pinion 31 of the first rack and pinion mechanism 25 to the rack 33. At the same time, the steering torque sensor 41 detects the steering torque. Based on an output signal from the steering torque sensor, the control unit 42 produces a control signal, which is then provided to the electric motor 43. The electric motor 43, based on the control signal, generate an assisting torque, which is transmitted via the second pinion 45 of the second rack and pinion mechanism 44 to the rack 33. The steering torque produced from the steering wheel 21 and the assisting torque generated from the electric motor 43 are added together to form a combined torque. The combined torque is then transmitted through the rack 33, tie rods 26 and knuckle arms 28 to the steerable wheels 27 and thus steers the steerable wheels 27.

The auxiliary steering mechanism 50 is constructed to drive an actuator 52 on the basis of steering conditions set in advance in an auxiliary control unit 51, so as to displace the housing 35 in the widthwise direction of a vehicle body. The auxiliary control unit 51 has a function to control operation of the actuator 52 based on output signals (detection signals) from a steering angle sensor 53 for detecting a steering angle of the steering wheel 21, a vehicle speed sensor 54 for detecting a running speed of the vehicle, and a displacement sensor 55 for detecting the amount of displacement of the housing 35.

The auxiliary steering mechanism 50 supports the housing 35 on the vehicle body 35 via a link mechanism 60 such that the housing 35 is movable in the widthwise direction of the vehicle body. The link mechanism 60 serves as a support means for the housing 35. The actuator 52 drives the link mechanism 60 via a drive link 64 for causing the link mechanism 60 to swing, thereby displacing the housing in the widthwise direction of the vehicle body. The construction of the auxiliary steering mechanism 50 will be described in greater detail with reference to FIG. 2.

Figure 2:
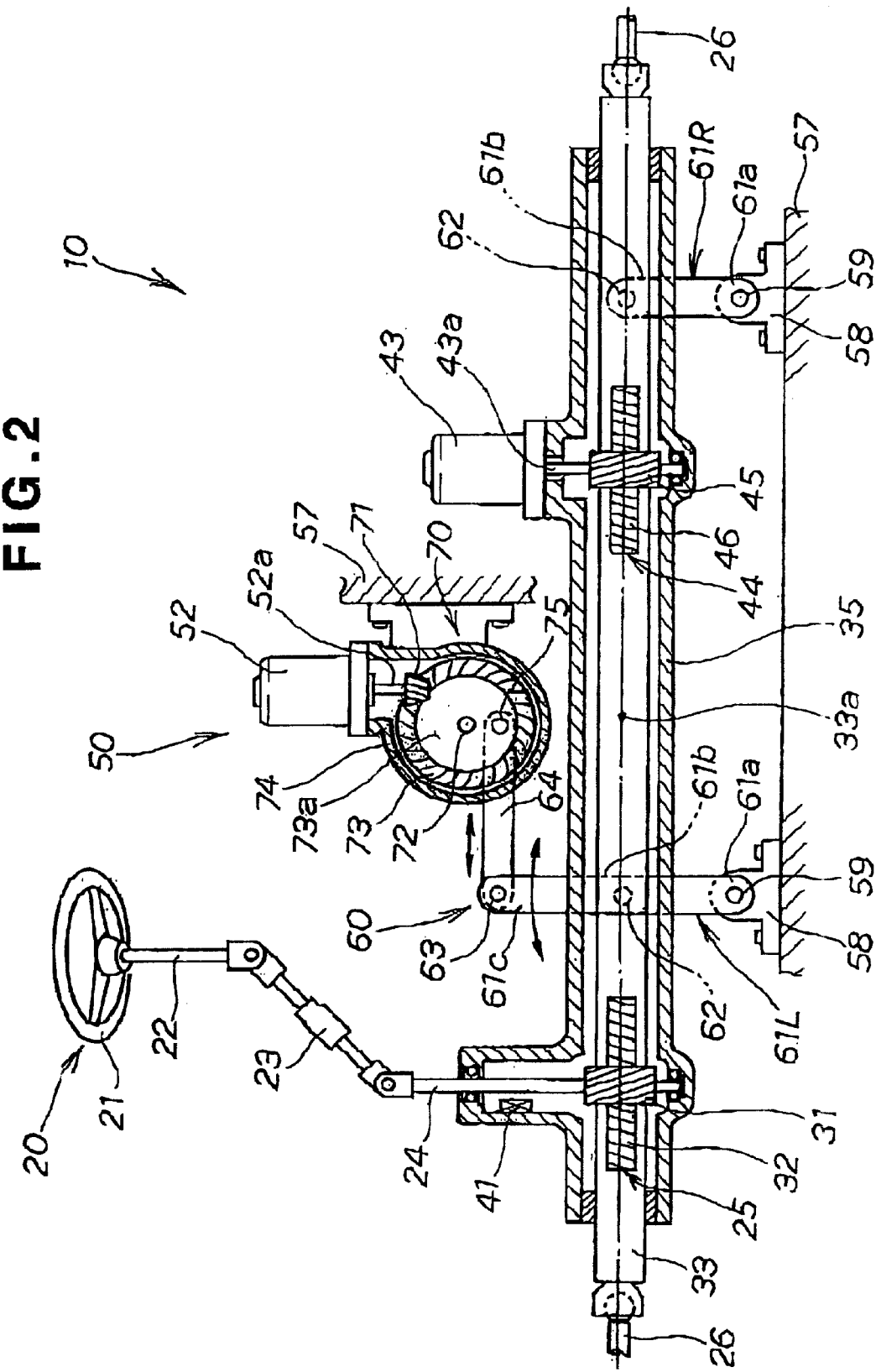
FIG. 2 is a detailed view of a portion of FIG. 1.

As shown in FIG. 2, the link mechanism 60 of the auxiliary steering mechanism 50 comprises a pair of left and right link arms 61L and 61R pivotally mounted to the vehicle body 57 so that they are pivotally movable in the widthwise direction of the vehicle body 57. The left and right (or first and seconds link arms 61L, 61R each have one end 61a (lower end in FIG. 2) connected by a pivot shaft 59 to a bracket 58 mounted to the vehicle body 57. The link arms 61L, 52R normally extend in perpendicular relation to the longitudinal axis of the rack 33. The first link arm 61L extends upwardly beyond the housing 35 and has an intermediate portion 61b pivotally connected by a pin 62 to the housing 35. The opposite end 61b (upper end in FIG. 2) of the second link arm 61R is pivotally connected by a pin 62 to the housing 35. The intermediate portion 61b of the left link arm 61L and the upper end 61b of the right link arm 61R form oscillating ends of the respective link arms 61L, 61R.

The pins 62 used for connecting the link arms 61L, 61R to the housing 35 are located adjacent to the rack 35. Specifically, the pins 62 are disposed horizontally in the same plane as the axis 33a of the rack 33 and extend perpendicularly to the axis 33a of the rack 33. The first and second link arms 61L, 61R together with the vehicle body 57 and the housing 35 form a quadric parallel linkage.

A power transmission mechanism 70 comprises a reduction gear mechanism having a small gear or pinion 71 attached to an output shaft 52a of the actuator 51, a large gear 73 meshing with the small gear 71 and rotatably mounted on a support shaft 72, and a gear case 74 accommodating within it the small and large gears 71, 73. The gear case 74 is mounted to the vehicle body 57 with the actuator 52 supported on the gear case 74. The drive link 64 forms a part of the power transmission mechanism 70.

The power transmission mechanism 70 disposed between the actuator 52 and the link mechanism 60 has a self-locking function to lock the actuator against a load or force applied from the link mechanism 69. The "self-licking function" used herein to refer to a function, which allows transmission of power from an input side to an output side, and blocks power transmission from the output side to the inputside. To achieve the self-locking function, the small and large gears 71, 73 are formed into hypoid gears, which generally have small power transmission efficiency in a reverse direction, that is, in a direction from the load side to the drive side. Such small reverse power transmission efficiency is set such that the actuator 52 can maintain its stationary state against the force applied from the link mechanism 60 disposed on the load side as viewed from the actuator 52. Thus accidental driving of the actuator 52 by external forces does not take place as long as the actuator is in its stationary or deactivated state.

The oscillating end 61b of the first link arm 61L has an end extension pivotally connected at its distal end 61c (upper end in FIG. 2) to an end of the drive link 64 by means of a pin 63. Thus, the first link arm 61L is pivotally connected via the drive link 64 to an output portion or the actuator 52. Specifically, the opposite end of the drive link 64 is pivotally connected to a circular body 73a of the large gear 73 at a position offset by a predetermined distance from the axis of rotation of the large gear 73. Thus, the pin 75 is eccentric to the axis of rotation of the large gear 73. The pivot shafts 59, 72 and the pins 62, 63, 75 are parallel to one another.

The auxiliary steering mechanism 50 of the foregoing construction operates as follows. When the first and second link arms 61L, 61R extend in a perpendicular direction of the rack 30, as shown in FIG. 2, they are disposed in a neutral position. In response to a given steering condition, the actuator 52 operates to turn the large gear 73 clockwise in FIG. 2 through a predetermined angle. This causes the drive link 64 to move leftward in FIG. 2, thus forcing the first link arm 61L to swing leftward in the same figure about the pivot shaft 59. In this instance, since the link mechanism 60 takes the form of a quadric parallel link, the second link arm 61R also swings leftward in phase with the first link arm 61L. Thus, the link mechanism 60 as a whole, the housing 35 and the first pinion 31 are displaced leftward as a single unit in the axial direction of the rack 33. The first pinion 31 does not rotate as long as the driver grips the steering wheel 21. Accordingly, the rack 33 moves leftward in the axial direction thereof together with the housing 35. By thus displacing the rack 33, the direction of the steerable wheels 27 (FIG. 1) can be changed.

From this condition, the large gear 73 is turned counterclockwise in FIG. 2 by means of the actuator 52 so as to move the first link arm 61L rightward until the link mechanism 60, housing 35, first pinion 31 and rack 33 return to the neutral position shown in FIG. 2. It will readily be appreciated from the foregoing description that by forcing the first lever 61L to swing rightward from the neutral direction of FIG. 1, the rack 33 is displaced rightward along the axis thereof. Thus, the steered angle of the steerable wheels 27 can be controlled independently of the manual steering operation of the driver.

It is further possible to rotate the large gear 73 of the power transmission mechanism 52 by the actuator 52 according to a given steering condition while the driver continues manipulation of the steering wheel 21. In this instance, the total amount of axial displacement (S0) of the rack 33 is determined by a combination of the amount of axial displacement (S1) of the rack achieved by manual steering operation effected at the steering wheel 21 by the driver, and the amount of axial displacement (S2) of the rack 33 achieved through operation of the actuator 52 (S0= S1±S2). By adding or alternatively subtracting the amount of actuator-dependent axial displacement (S2) of the rack 33 with respect to the amount of driver-dependent axis displacement (S1) of the rack 33, it is possible to realize a quicker turn or a slower turn at the steerable wheels 27. The maximum control variable achieved by the actuator 52, that is the maximum actuator-dependent axial displacement (S2) of the rack 33 in determined by a maximum range of displacement or the housing 35, link mechanism 60 and drive link 64. At least due to design requirements associated with these parts 35, 60, 64, the maximum controlled variable is restricted to a certain range.

Figure 3:
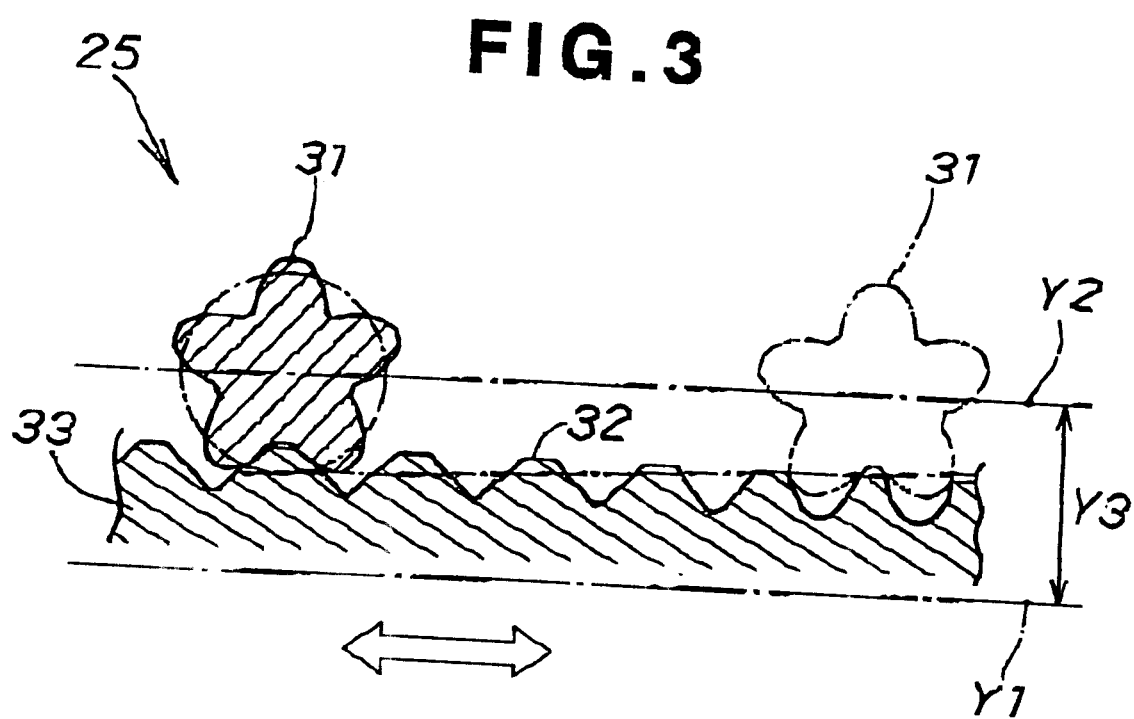
FIG. 3 an enlarged cross-sectional view showing a main portion of a rack and pinion mechanism of the steering system.

The rack and pinion mechanism 25, as shown on enlarged scale in FIG. 3, is of the so-called "variable gear ratio type" having a variable gear ratio, which is the lowest when the steering wheel 21 (FIG. 2) is in a neutral position and becomes higher as the steering angle of the steering wheel 21 becomes large. To this end, the rack 33 has a central portion of a smaller tooth pitch than adjacent portions extending contiguously from the central portion toward its both ends. The term "variable gear ratio" type is used herein to refer to a structure wherein the gear ratio varies depending on the position of mesh between the pinion 31 and the teeth 32 on the rack 33.

As shown in FIG. 3, the distance Y3 from the axis Y1 of the rack 33 with rack teeth 32 to the center Y2 of the pinion 31 is kept always constant regardless of the position of mesh between the pinion 31 and the rack 33. The pinion 31 has a fixed tooth pitch. The rack 33 has a tooth pitch distribution determined such that the rack tooth pitch becomes smaller as the distance or offset from the central portion (on the left side in FIG. 3) increases. The rack tooth thickness also varies directly as the tooth pitch.

Figure 4:
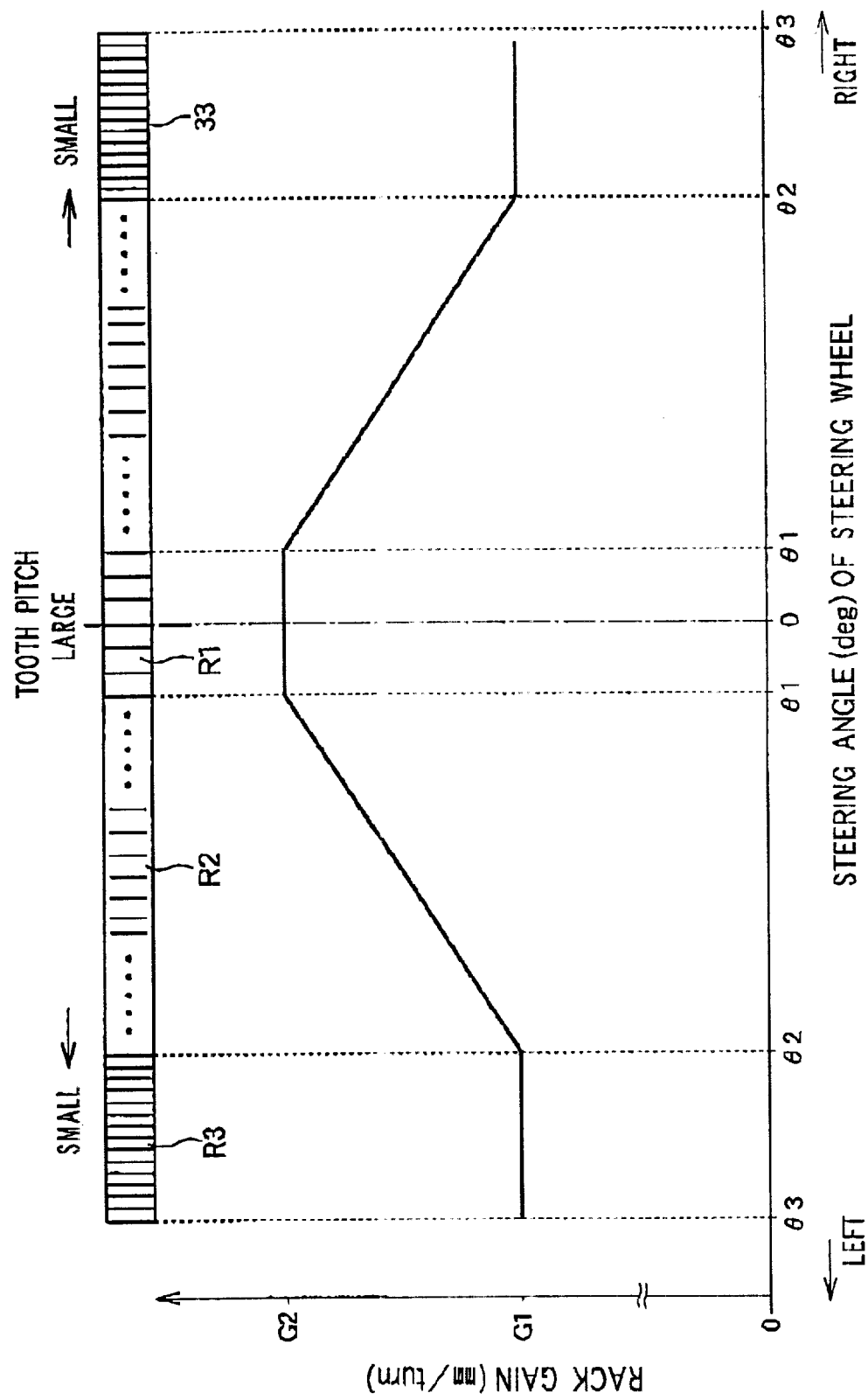
FIG. 4 is a view illustrative of a rack tooth pitch distribution to produce a variable rack gain property of the rack and pinion mechanism.

FIG. 4 is a graphical representation of the relationship between the rack gain (mm/turn) of the first rack and pinion mechanism 25 and the steering angle (deg) of the steering wheel 21, which is shown in conjunction with the specific tooth pitch distribution of the rack 33. The midpoint on the x-axis of the graph represents the neutral position or the steering wheel 21, at which the steering angle of the steering wheel 21 is 0 degree. The right side of the midpoint (steering angle=0) represents a range of steering angles achieved when the steering wheel 21 is turned in the leftward direction from the neutral position to the left end or lock position. Similarly, the right side of the midpoint represents a range of steering angles achieved when the steering wheel 21 is turned in the rightward direction from the neutral position to the right end or lock position. The rack gain represents the amount of axial displacement (mm) of the rack 33 achieved when the pinion 31 (i.e., the steering wheel) makes one complete turn As shown in FIG. 4, the tooth pitch of the rack 33 is made larger at the central portion of the rack 33 than at both end portions of the rack 33. More specifically, the rack 33 has a central first region R1 generally corresponding in position to the neutral position of the steering wheel 21 (in the strict sense, this region is designed to extend over a central portion of an available range of the steering angles, which is offset from the neutral position by 13 at maximum in each rotational sense for providing a steering play). The fist region R1 has a fixed rack tooth pitch, and this tooth pitch is larger than the tooth pitch of any other region of the rack 33. Thus, in the first region R with the fixed largest tooth pitch, the gear ratio of the rack and pinion mechanism 25 is fixed at a value lower than the value of any other region of the rack 33. The rack gain in the first region R1 is set to be G2 mm/turn.

A second region P2 of the rack 33 extends contiguously from the first region R1 in one direction along the axis of the rack 33 over a length corresponding to a range of steering angles extending from θ1 to θ2 in each rotational sense. The second region R2 has a variable rack tooth pitch which is smaller than the tooth pitch of the first region R1 and decreases progressively in a direction from an end of the first region R1 toward an end of the second region R2 opposite from the first region R1. This means that in the second region R2, the gear ratio of the rack and pinion mechanism 25 becomes higher as the steering angle becomes large. Owing to the variable gear ratio, the rack gain in the second region R2 declines from G3 mm/turn to G2 mm/turn.

A third region R3 of the rack 33 is contiguous to the end of the second region R2 remote from the first region R1 and corresponds in position to an end portion of an available range of the steering angles, which extends from θ2 to θ3 in each rotational sense. The third region R3 has a fixed rack tooth pitch, which is smaller than the tooth pitches of the first and second regions R1 and R2. In the third region R3, the rack and pinion mechanism 25 provides a fixed gear ratio, which is higher than the gear ratios attained in the first and second regions R1, R2. The rack gain in the third region R3 is G1 mm/turn, which is smaller than those achieved in the first and second regions R1 and R2.

Figure 5A:
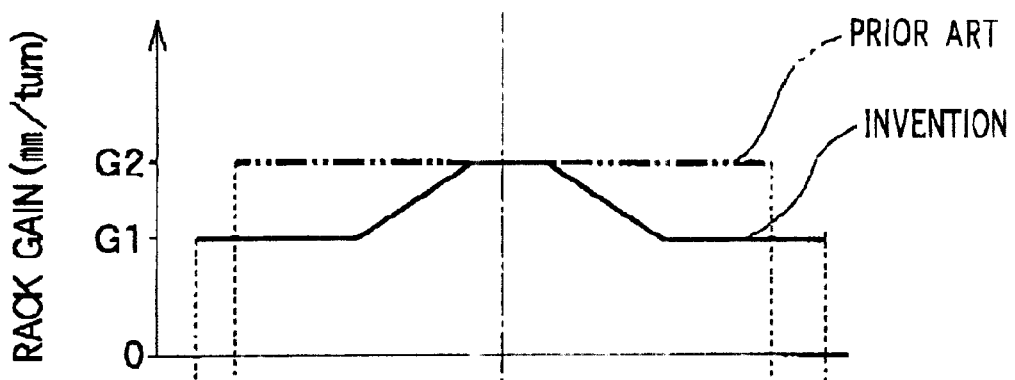
FIGS. 5A and 5B are graphs showing, for comparative purposes, the relationships between the rack gain and the steering ratio of the steering system of the present invention and those of the conventional steering system.
Figure 12A:
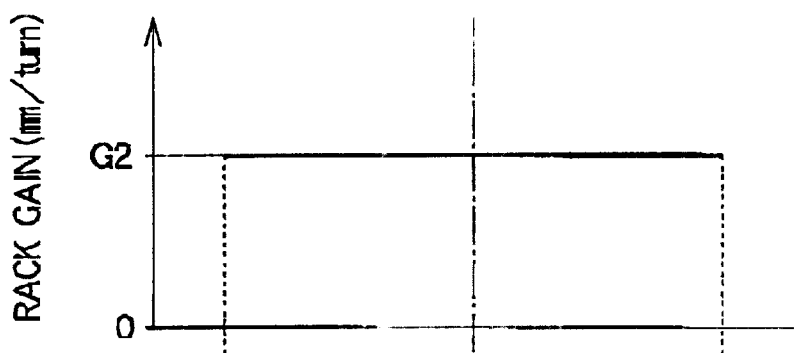
FIGS. 12A, 12B and 12C are graphs showing the relationships between the rack gain and the steering ratio of the conventional steering system.

FIG. 5A is a graph showing, for comparative purposes, the rack gain characteristic shown in FIG. 4 as achieved by the vehicle steering system according to the present invention, and the rack gain characteristic shown in FIG. 12A as achieved by the conventional vehicle steering system. As seen from FIG. 5A, when the steering wheel is in a central region near the neutral position (corresponding to the region R1 of the rack 33 shown in FIG. 4), the steering system of the present invention achieves the same rack gain (i.e., G2 mm/turn) as the conventional steering system. By virtue of the tooth pitch distribution of the rack 33 designed for producing a variable rack gain property in relation to a steering input, the steering system of the present invention has an available range of steering angles (θ3 on the left side to θ3 on the right side) which is larger than that (θ12 on the left side to θ12 on the right side) of the conventional steering system having a fixed rack gains.

Figure 5B:
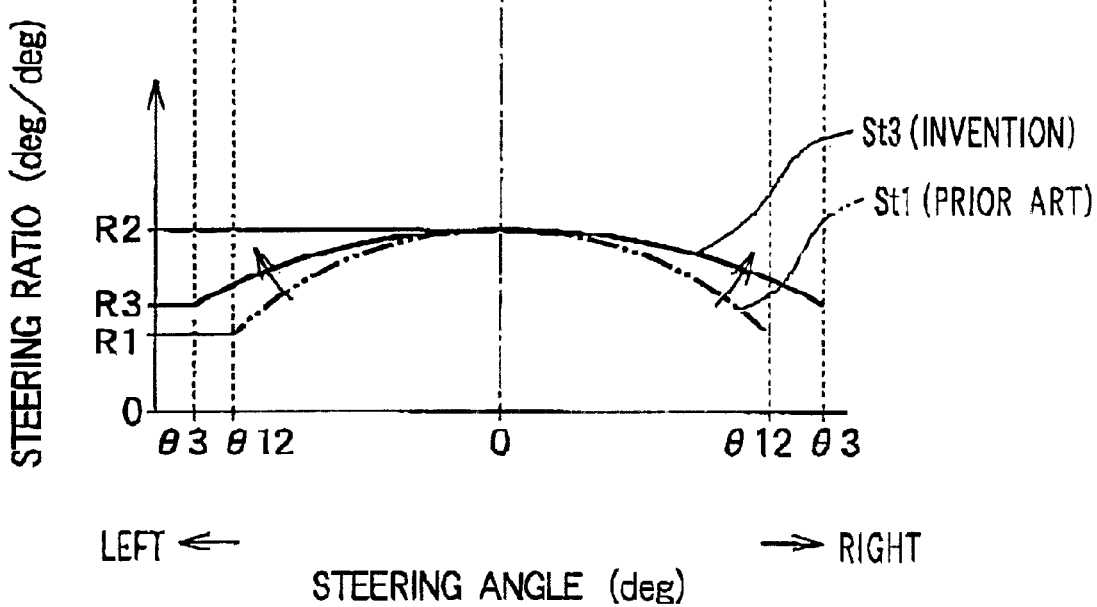
Figure 12B:
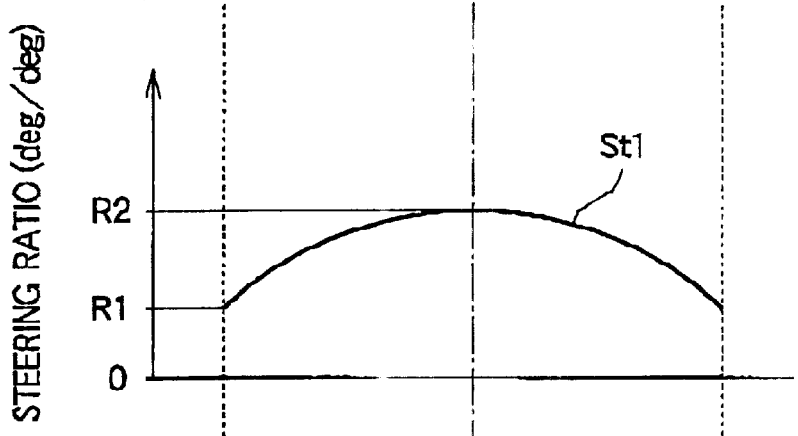

FIG. 5B is a graph showing, for comparative purposed, a steering ratio characteristic curve St3 achieved by the vehicle steering system of the present invention, together with the steering ratio characteristic curve St1 shown in FIG. 12B as achieved by the conventional vehicle steering system. As shown in FIG. 5B, the steering system of the present invention has the same steering ratio as the conventional steering system when the steering wheel moves in a central region corresponding to the central region R1 or the rack 33 shown in FIG. 4. By virtue of the rack gain decreasing progressively as the steering angle, as achieved in the intermediate region R2 (FIG. 4) of the rack 33, the solid-lined steering ratio characteristic curve St3 of the present invention has a larger radius of curvature than (or curves gently as compared to) the phantom-lined steering ratio characteristic curve St1 of the conventional steering system.

At the maximum steering angle θ3, the steering system of the present invention achieves a steering ratio R3, which is higher than the steering ratio R1 at the maximum steering angle θ12 of the conventional steering system. The higher steering ratio R3 responds more slowly to the steering wheel but requires less power to operate than the lower steering ratio R1 does.

Figure 6A:
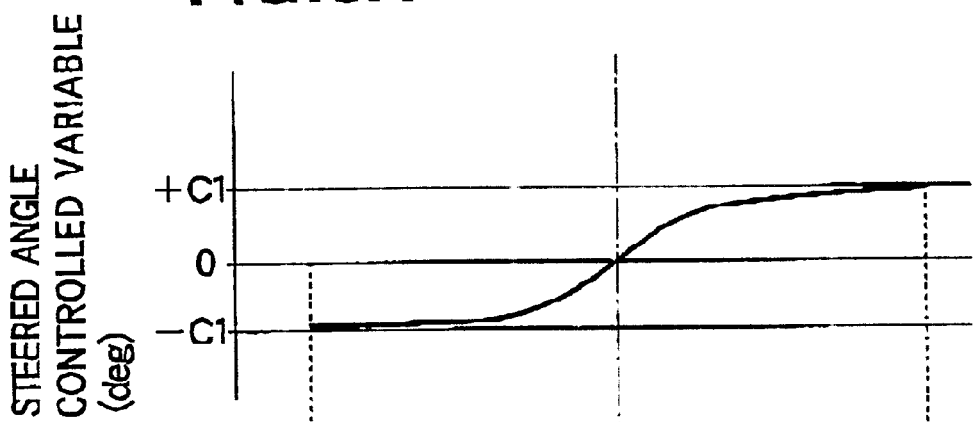
FIGS. 6A and 6B are graphs showing, for comparative purposes, the relationships between the steered angle control variable and the steering ratio of the steering system of the present invention and those of the conventional steering system.

FIG. 6A is a graphical representation of the relationship between the steered angle controlled variable and the steering angle of the steering system according to the present invention. The steered angle controlled variable represents the controlled variable indicated in terms of the steered angle, which is used when controlling the steered angle of the steerable wheel 27 by displacing the rack 33 by the actuator 52.

As mentioned previously, the rack gain decreases with the steering angle of the steering wheel 27, and the controlled variable achieved by the actuator 52 to control the amount of displacement of the rack 33 is limited to a certain range. However, it appears clear from FIG. 6A that the steered angle controlled variable is still smaller than the maximum value C1 even at the maximum steering angle θ3. This means that the steered angle of the steerable wheel 27 can be controlled in relation to the steering angles ranging from 63 to 63 across the neutral position.

Figure 6B:
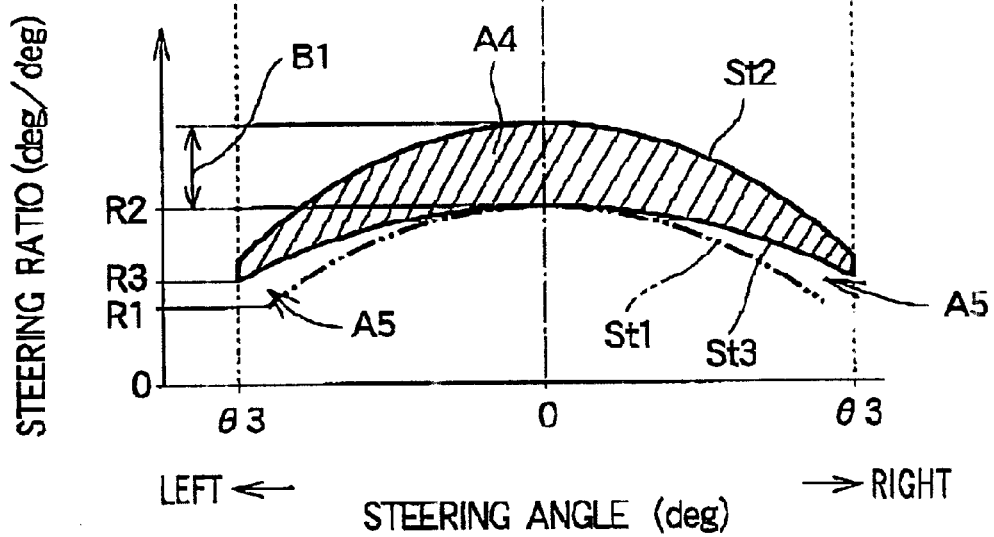

FIG. 6B is a graph showing a steering ratio control range A4, which is achieved when the range of steering ratio is controlled by the actuator 52 according to the present invention. The steering ratio control range A4, as indicated by hatching in this figure, has a lower limit (control limit on the quick steer side) defined by the steering ratio characteristic curve St3 shown in FIG. 5B, and an upper limit (control limit on the slow steer side) defined by the controllable upper limit steering ratio characteristic curve St2 shown in FIG. 12C. The hatched steering ratio control range A4 has a maximum width B1.

The controllable upper limit steering ratio characteristic curve St2 is determined on the basis of the total amount of axial displacement of the rack 33 achieved over the full range of steering angles under the control of the actuator 52. This curve St2 defines an upper limit of control of the steering ratio extending upward from the lower control limit defined by the curve St3 and has a maximum width B1. The steering ratio control range A4 is a range of steering ratio that can be controlled according to the total amount or axial displacement (S0) or the rack 33 determined by subtracting the amount of axial displacement (S2) of the rack achieved by operation of the actuator 52 from the amount of axial displacement (S1) of the rack 33 achieved by manual steering operation of the driver effected at the steering wheel 21 (S0=S1–S2). Thus, with the steering ratio characteristic curve St3 used as a control reference on the quick steer side, the actuator 52 can control the slow steer of the steerable wheels 27.

Since S0=S1–S2 as discussed previously, this means that the amount or driver-dependent displacement S1 or the rack can be increased by subtracting an inverse of the amount of actuator-dependent displacement 52 of the rack from S1 (that is, by moving the rack 33 and the housing 35 by the actuator 52 in a direction opposite to the direction intended by the steering wheel 21).

During steering operation, a reaction force from the road, which is transferred from the steerable wheels 27 to the rack 33, acts on the rack 33 in a direction opposite to the moving direction of the rack 32 intended by the steering wheel 21. The direction of the reaction force is the same as the direction of movement of the housing 35, so that the load on the actuator 52 is partly relieved. This leads to an increased response speed of the actuator with reduced power consumption.

The steered angle control characteristic curve shown in FIG. 6A is used for converting the steering ratio characteristic curve St3 of FIG. 6B into the controllable upper limit steering ratio characteristic curve St2. Thus, the gradient of the controllable upper limit steering ratio characteristic curve St2 agrees with that of the steered angle control characteristic curve.

As shown in FIG. 6A, the steered angle controlled variable is still smaller than the maximum value C1 even at the maximum steering angle θ3. This ensures that the steered angle of the steerable wheel 27 can be controlled with respect to all of the steering angles ranging from θ3 to θ3 across the neutral position, and the steering ratio control range A4 (FIG. 6B) becomes similar to the optimum steering ratio control range A1 shown in FIG. 12C. In spite or the limited steered angle controlled variable, the steering system 10 of the present invention performs control of the steering ratio with a wider variable range than as achieved by the conventional steering system.

Various measures taken to realize the steering ratio control with wide controllable range will be enumerated below.

(1) The first rack and pinion mechanism 25 has a variable gear ratio, which is the lowest when the steering wheel 21 is in the neutral position and becomes higher as the steering angle of the steering wheel becomes large. With the variable gear ratio, the rack gain decreases with an increase in the steering angle, as shown in FIG. 5A.

(2) This will provide a lower steering ratio for a larger steering angle, as compared to the steering ratio achieved by the conventional steering system (with the resulting steering ratio reduction from R1 to R3 shown in FIG. 6B) As a result, the characteristic curve St3 (defining a lover control limit on the quick steer side) curves gently as compared to the corresponding characteristic curve St1.

(3) The amount of axial displacement of the rack 33 for one complete turn or the steering wheel 21 decreases inversely with the steering angle. In combination therewith, the proportion of the displacement of the housing per unit steering angle can be reduced. This provides a gentle gradient to the steered angle controlled variable curve shown in FIG. 6A.

(4) As understood from FIGS. 6A and 6B, the steering ratio can be controlled with respect to the full range of steering angles (extending from θ3 to θ3 across the neutral position) even through a limited steered angle controlled variable (amount of displacement of the housing 35) is used.

Figure 12C:
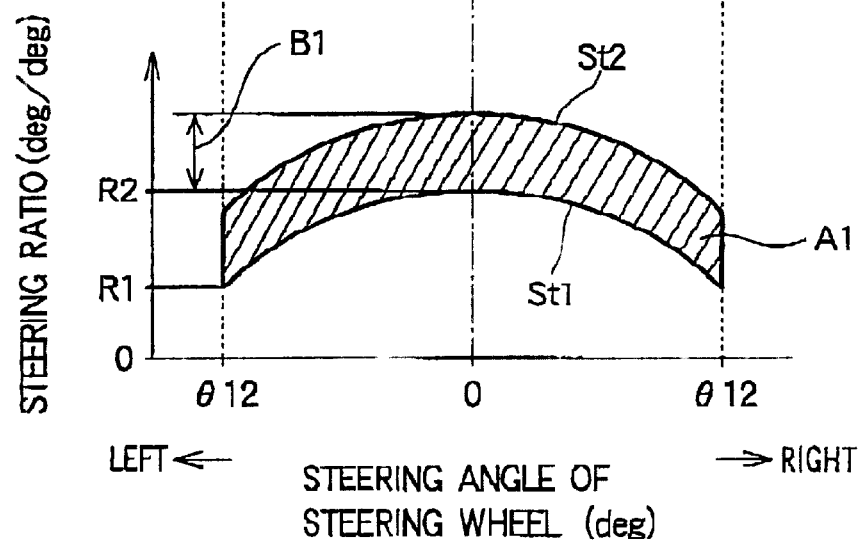
Figure 13A:
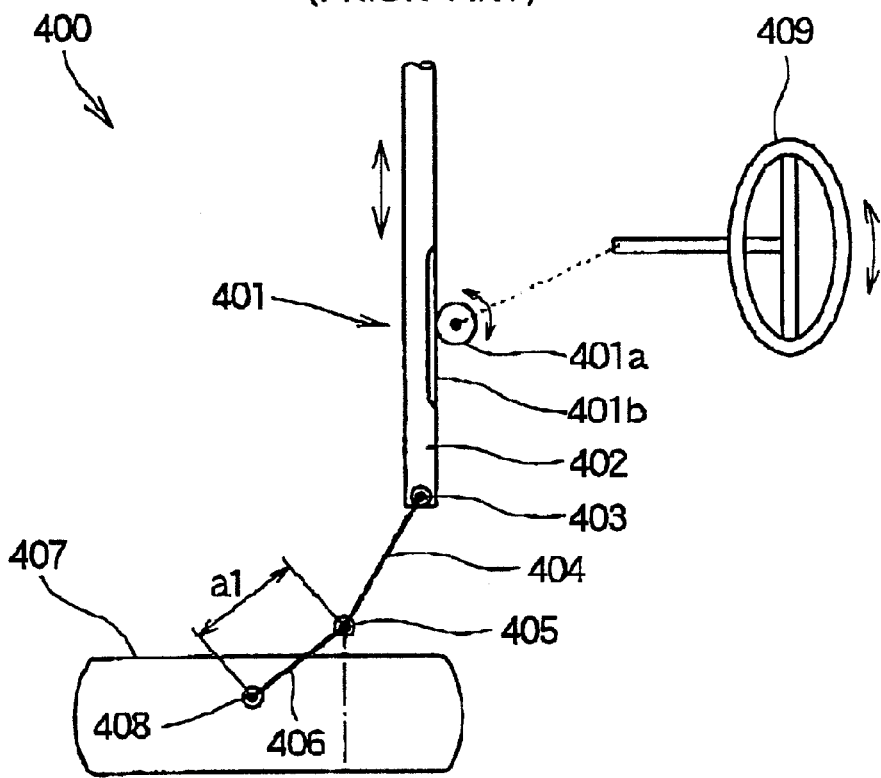
FIGS. 13A and 13B are diagrammatical views showing the general arrangement of a conventional steering system.
Figure 13B:
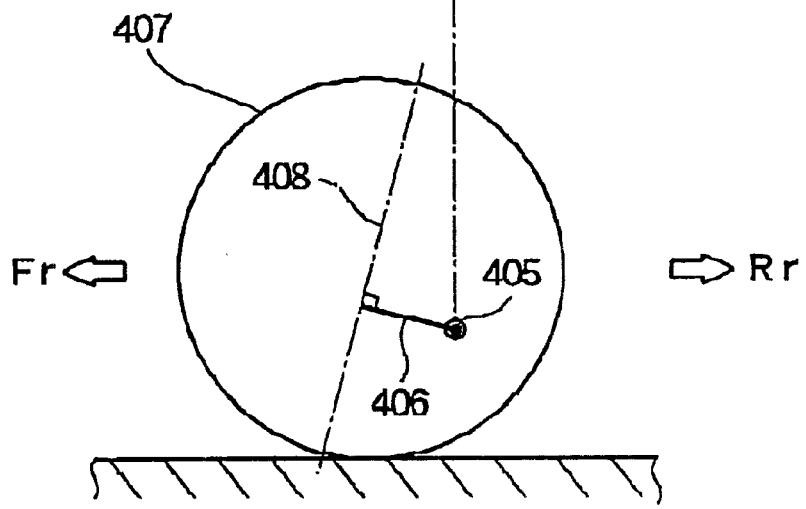
Figure 14:
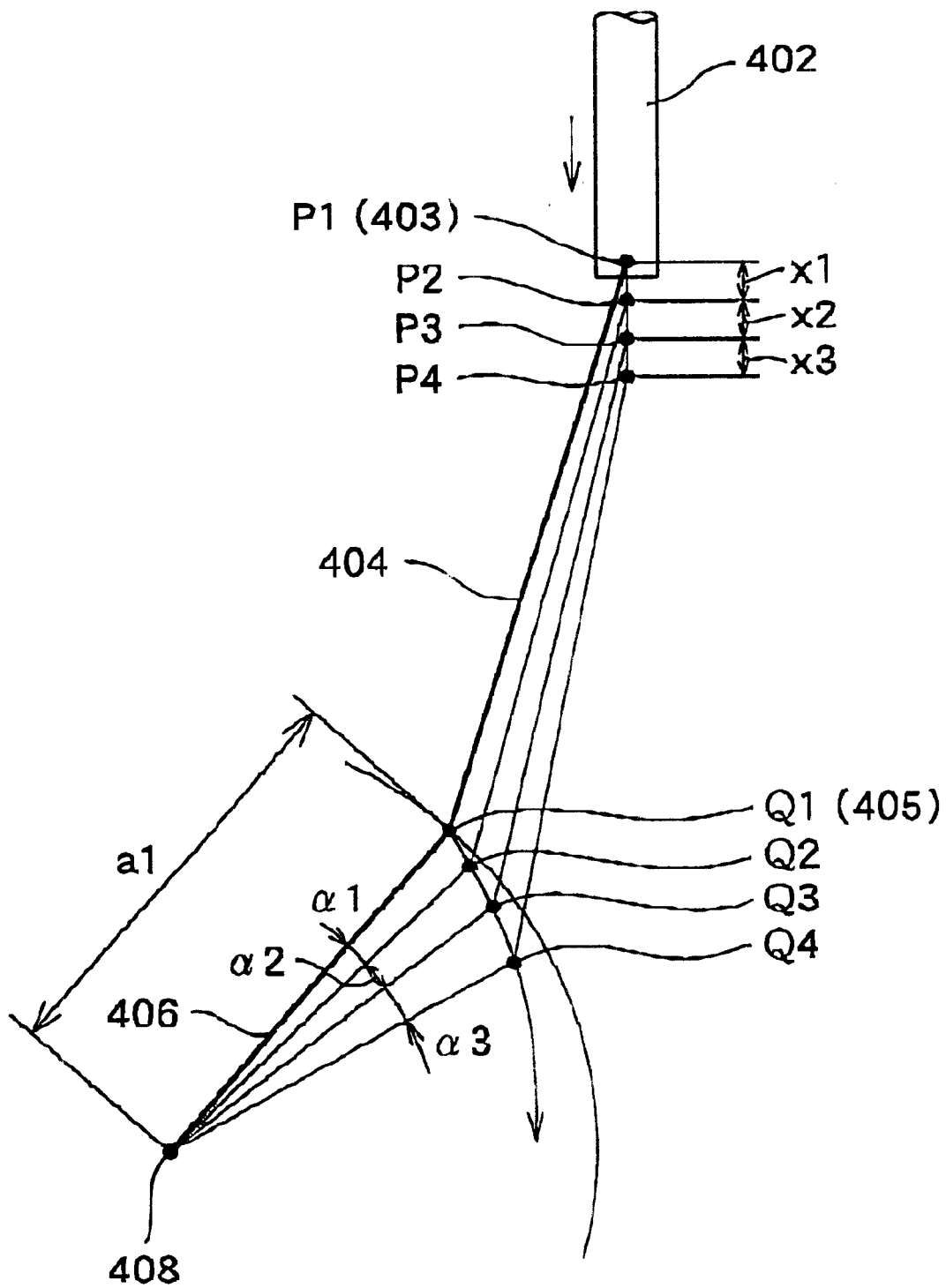
FIG. 14 is a view showing the relationships between the rack gain and the steering ratio of the conventional steering system shown in FIGS. 13A and 13B.
Figure 15A:
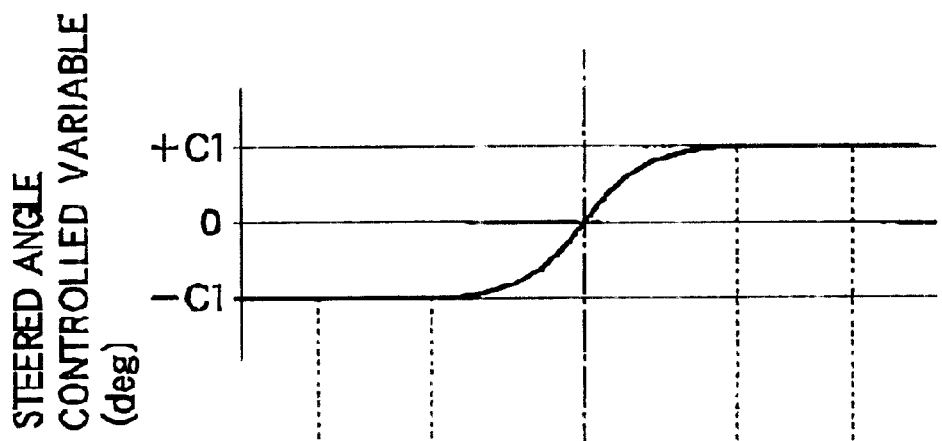
FIGS. 15A and 15B are graphs showing the relationships between the steered angle control variable and the steering ratio of the conventional steering system.
Figure 15B:
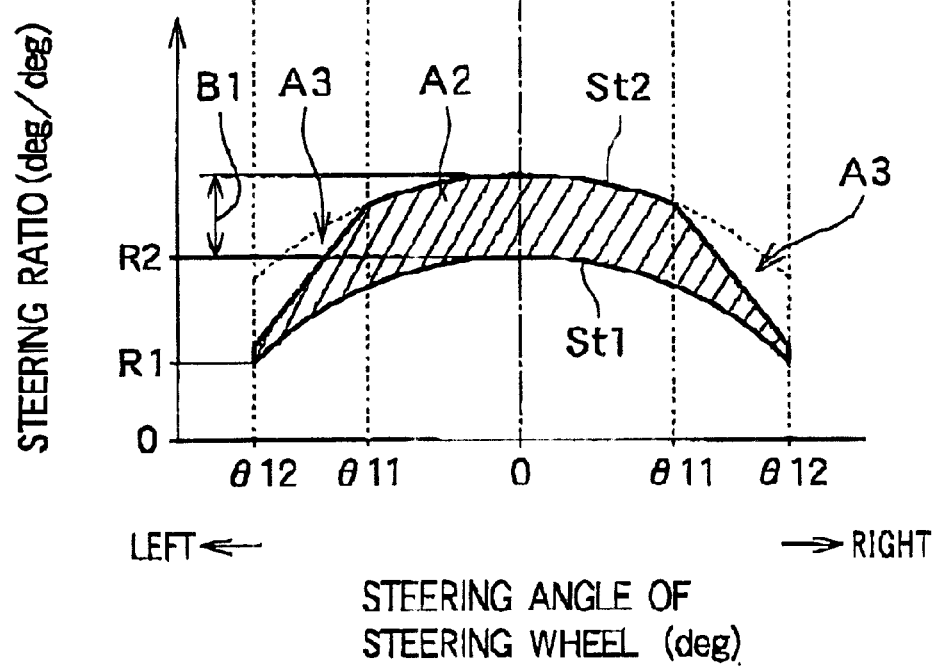

(5) The steering ratio characteristic curve St3 of the present invention, as converted from the corresponding characteristic curve St1 of the conventional steering system, produces uncontrollable or inert areas A5, which become wider as the steering angle. The inert areas A5 narrow the steering ratio control range A4 correspondingly. However, the inert areas A5 corresponds in position to a region in which an excessively small steering ratio is likely to occur as the steering angle increases, causing the steerable wheels 27 to pivot more quickly than as intended by the steering wheel. Accordingly, it can be considered that the presence of the inert areas A5 does not affect the performance characteristics of the steering system. The steering ratio control range A4 of the present invention becomes similar to the optimum steering ratio control range A1 (FIG. 12C).

Figure 7:
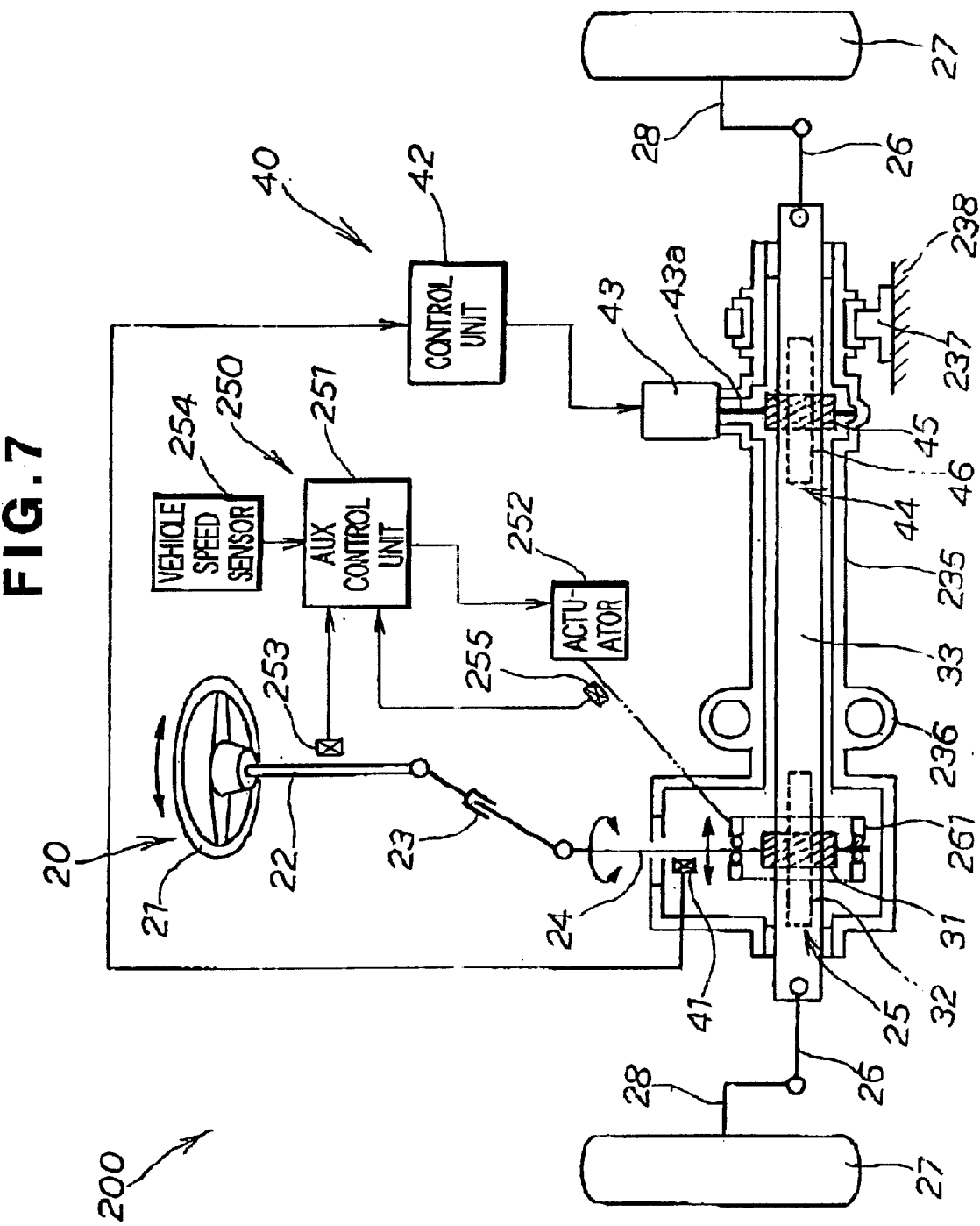
FIG. 7 is a schematic view showing the general arrangement of a vehicle steering system according to a second embodiment of the present invention.

FIG. 7 shows a vehicle steering system according to a second embodiment of the present invention. The same reference characters designate these parts, which are like, or corresponding to those of the first embodiment shown in FIG. 1, and further description thereof can, therefore, be omitted.

As shown in FIG. 7, the vehicle steering system 200 generally comprises a steering system 20, a torque assist-mechanism 40, and an auxiliary steering mechanism 250. The vehicle steering system 200 is of the so-called "end takeoff" type constructed so that a steering torque can be taken out from opposite ends of a rack 33. The auxiliary steering mechanism 250 controls steered angle of the steerable wheels 27, 27 independently of manual steering operation effected at the steering wheel 21 by the driver The steering system 200 includes a rack and pinion mechanism 25 having the same construction as discussed above with reference to FIGS. 3 and 4. That is, the rack and pinion mechanism 25 has a variable gear ratio, which in the lowest when the steering wheel 21 is in a neutral position and becomes higher as the steering angle of the steering wheel 21 becomes large. The steering system 200 having such variable gear ratio type rack and pinion mechanism is able to perform the same operation as discussed above with reference to FIGS. 5A–5B and 6A–6B.

The auxiliary steering mechanism 250 includes a housing 235 in which the rack and pinion mechanism 25 is accommodated. The housing 235 is an elongated casing concentric with the axis of the rack 33 and extending in the widthwise direction of a vehicle body 238. The housing 235 is mounted to the vehicle body 238 via a bracket 236 and a support member 237, such that the rack 33 is reciprocally movable in the widthwise direction of the vehicle. A steering torque sensor A1 and an electric motor 43 are mounted to the housing 235.

Figure 8:
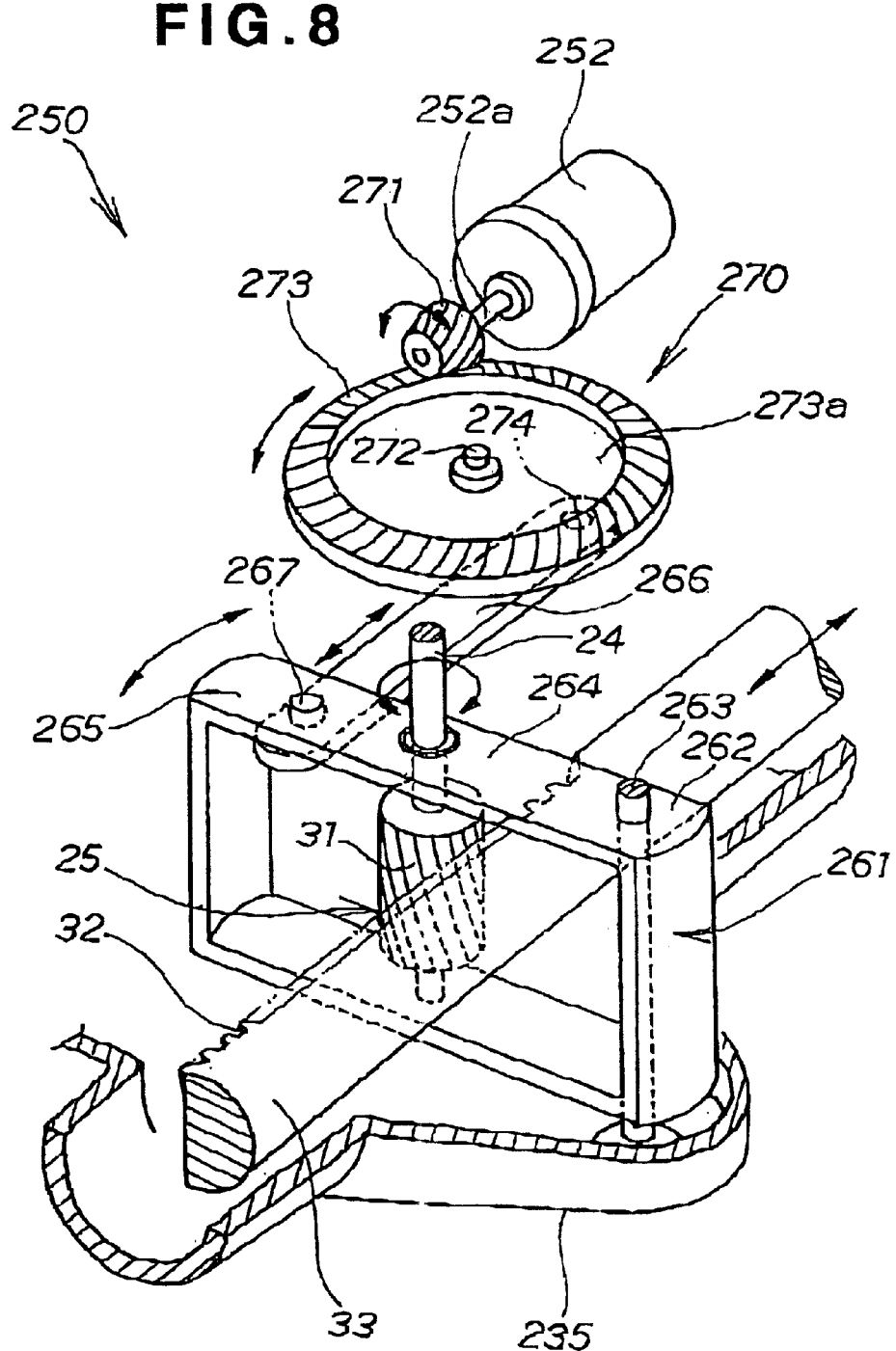
FIG. 8 is a perspective view of an auxiliary steering mechanism of the vehicle steering system of the second embodiment.

The auxiliary steering mechanism 250 is constructed to drive an actuator 252 on the basis of steering conditions set in advance in an auxiliary control unit 251, so as to displace the pinion 31 in the axial direction of rack 33 according to a given condition. The auxiliary control unit 251 has a function to control operation of the actuator 252 based on output signals (detection signals) from a steering angle sensor 253 for detecting a steering angle of the steering wheel 21, a vehicle speed sensor 254 for detecting a running speed of the vehicle, and a displacement sensor 255 for detecting the amount of displacement of the pinion 31. Structural details of the auxiliary steering mechanism will be described below with reference to FIGS. 8 to 10.

The auxiliary steering mechanism 250 has a vertical swing arm 261 of a hollow structure pivotally connected at one end (right end in FIG. 8) to the housing 235 by means of a pivot shaft 263. The swing arm 261 extends transversely across the axis of the rack 33, and the rack 33 extends through the hollow swing arm 261. The swing arm 261 has an free end portion 265 operatively connected via a drive link 266 and a power transmission mechanism 270 to the output portion or shaft 252a of the actuator 252, and an intermediate portion 264 rotatably supporting the pinion 31 such that the pinion 31 is in mesh with the teeth 32 of the rack 33 within an internal space of the hollow swing arm 261. The swing arm 261 serves as a support means for the pinion 31 The actuator 252 comprises an electric motor, and the drive link 266 forms a part of the power transmission mechanism 270.

The power transmission mechanism 270 comprises a reduction gear mechanism having a small gear or pinion 271 attached to the output shaft 252a of the actuator 251, and a large gear 273 meshing with the small gear 271 and rotatably mounted on a support shaft 272.

The power transmission mechanism 270 disposed between the actuator 252 and the swing arm 261 has a self-looking function to look the actuator against a load or force applied from the swing arm 261. To achieve the self-locking function, the small and large gears 271, 273 are formed into hypoid gears, which generally have small power transmission efficiency in a reverse direction, i.e., in a direction from the load side to the drive side. Such small reverse power transmission efficiency is set such that the actuator 252 can maintain its stationary or deactivated state against the force applied from the swing arm 261 disposed on the load side as viewed from the actuator 252. Thus, accidental driving of the actuator 252 by external forces does not take place as long as the actuator 252 is in the stationary state.

The free end (oscillating end) 265 of the swing arm 261 is pivotally connected to one end of the drive link 266 by means of a pin 267. The opposite end of the drive link 266 is pivotally connected by a pin 274 to a circular body 273a of the large gear 273 at a position offset by a predetermined distance from the axis of rotation of the large gear 273. Thus, the pin 274 is eccentric to the axis of rotation of the large gear 273. The pinion 31, the shafts 263, 272, and the pins 267, 274 are parallel to one another.

Figure 9:
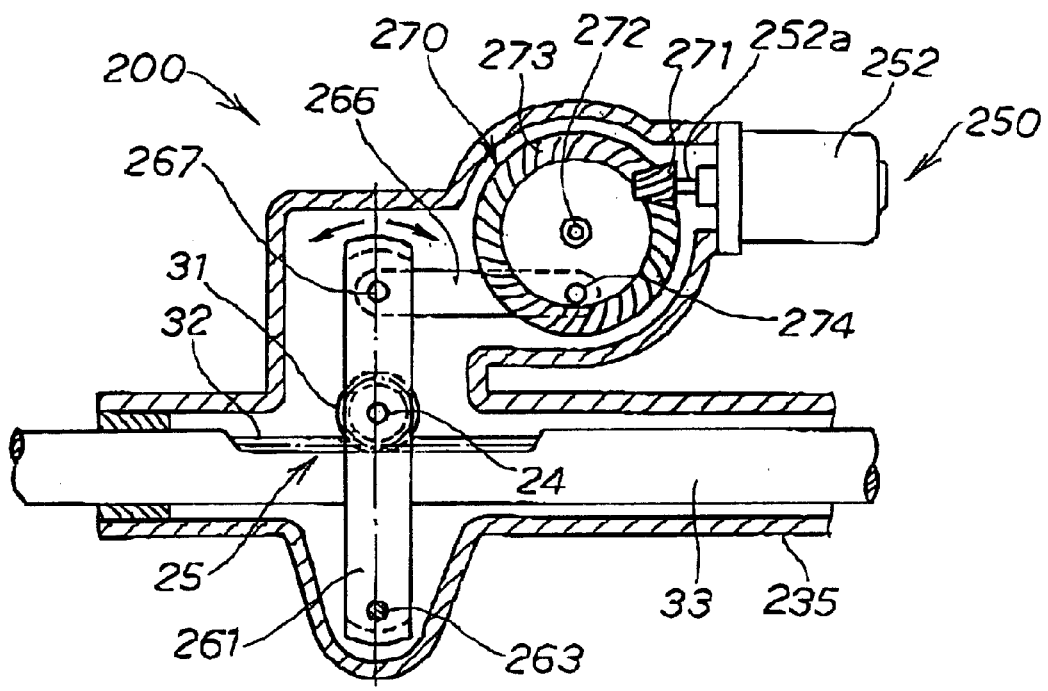
FIG. 9 is a horizontal cross-sectional view of the auxiliary steering mechanism.

As shown in FIG. 9, the auxiliary steering mechanism 250 is received in the housing 235, and the actuator 252 is mounted to the housing 235. The swing arm 262 normally extends perpendicularly across the axis of the rack 33. When the swing arm 261 is in the position shown in FIG. 9, the auxiliary steering mechanism 250 is disposed in the neutral position. With this arrangement, in response to operation of the actuator 252, the swing arm 261 pivots or turns about the shaft 263 to move the pinion 31 in the axial direction of the rack 33 via the power transmission mechanism 270.

The auxiliary steering mechanism 250 operates as follows.

Figure 10:
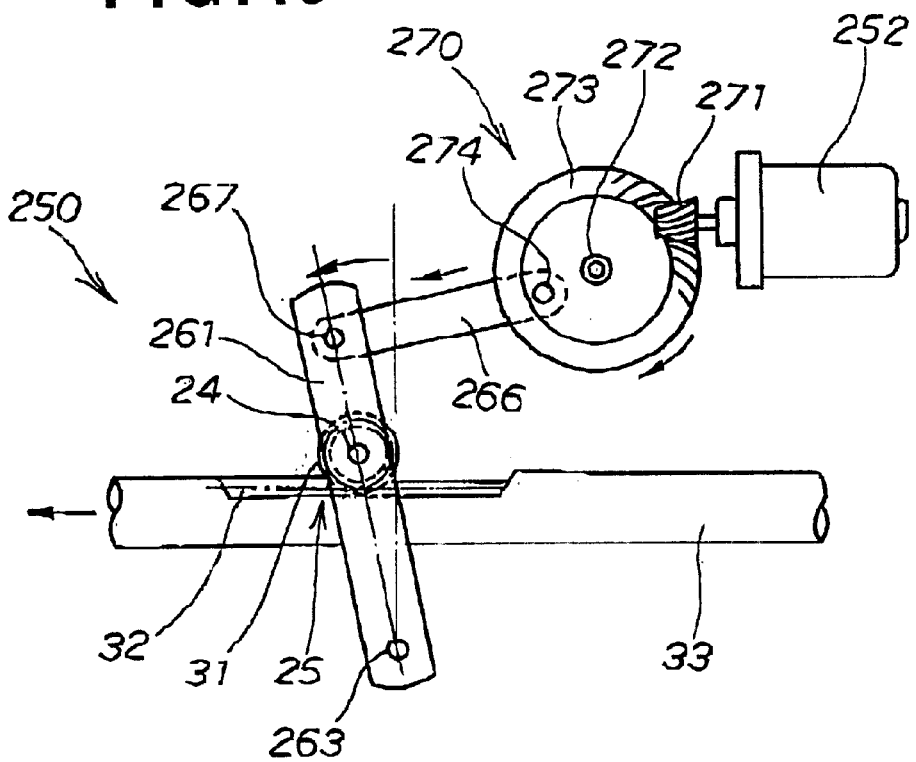
FIG. 10 is a view similar to FIG. 9, showing the operation of the auxiliary steering mechanism.
Figure 11:
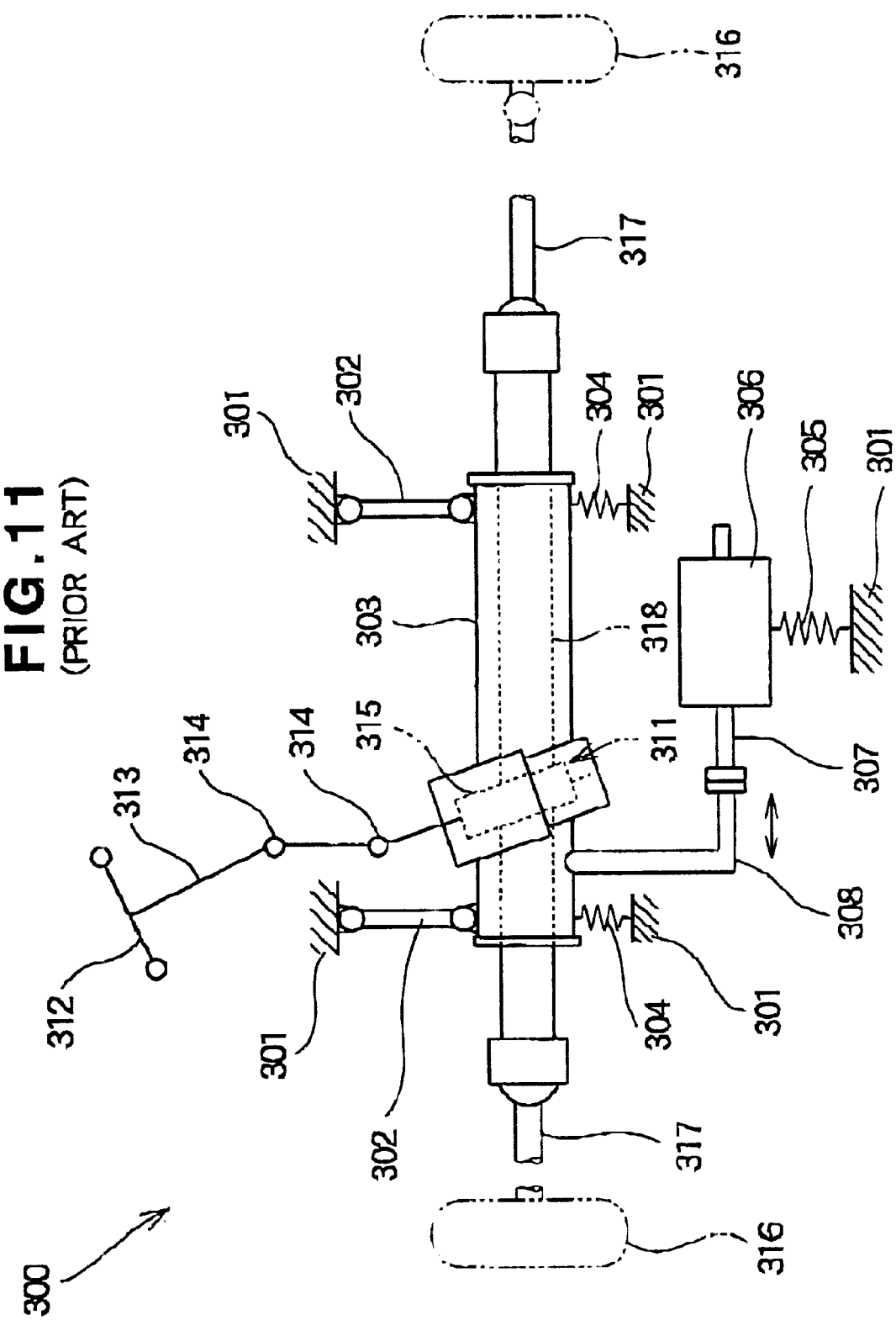
FIG. 11 is a schematic view showing the general arrangement of a conventional vehicle steering system.

In response to a given steering condition supplied from the auxiliary control unit 252, the actuator 252 operates to turn the large gear 273 clockwise in FIG. 9 through a predetermined angle. This causes the drive link 266 to move leftward in FIG. 9, thus forcing the swing arm 261 to swing leftward in the same figure about the pivot shaft 263, as shown in FIG. 10. In this instance, since the pinion 31 is rotatably mounted to the swing arm 261, the pinion 31 moves leftward on the rack teeth 32 of the rack 33. The pinion 31 does not rotate as long as the driver grips the steering wheel 21. Accordingly, the rack 33 moves leftward in the axial direction thereof together with the housing 235. By thus displacing the rack 33, the direction of the steerable wheels 27 (FIG. 8) can be changed.

From this condition, the large gear 273 is turned counterclockwise in FIG. 10 by means of the actuator 252 so as to move the swing arm 261 rightward in FIG. 10 until the swing arm 261 and the pinion 31 return to the neutral position shown in FIG. 9. It will readily be appreciated from the foregoing description that by forcing the swing arm 261 to swing rightward from the neutral direction of FIG. 9, the rack 33 is displaced rightward along the axis thereof. Thus the steered angle of the steerable wheels 27 can be controlled independently of the manual steering operation effected at the steering wheel by the driver.

It is further possible to rotate the large gear 273 of the power transmission mechanism 252 by the actuator 252 according to a given steering condition while the driver continues manipulation of the steering wheel 21 (FIG. 7). In this instance, the total amount of axial displacement (S10) of the rack 33 is represented by a combination of the amount of axial displacement (S11) of the rack achieved by manual steering operation of the driver effected at the steering wheel 21, and the amount of axial displacement (S12) of the rack 33 achieved by operation of the actuator 252 (S10=S11±S12). By adding or alternatively subtracting the amount of actuator-dependent axial displacement (S12) of the rack 33 with respect to the amount of driver-dependent axis displacement (S11) of the rack 33, it is possible to realize a quicker turn or a slower turn at the steerable wheels 27. The range of angular movement of the swing arm 261 is sufficiently small so as not to effect reliable meshing engagement between the rack 33 and the pinion 31.

In the steering system 200 of the second embodiment shown in FIG. 7, the steerable wheels 27 can be steered also by displacing the pinion 31 in the axial direction of the rack 33, with the rack and pinion mechanism 25 being accommodated in the housing 235. With this arrangement, the steering ratio can he controlled through adequate control of the steered angle of the steerable wheels 27 based on the amount of displacement of the pinion 31. The amount of displacement of the pinion 21 is limited to a certain range, so that the controllable variable used for controlling the steered angle is also limited to a certain range.

However, since the rack and pinion mechanism 25 is of the so-called "variable gear ratio" type having a variable gear ratio, which is the lowest when the steering wheel 21 is in the neutral position an becomes larger as the steering angle becomes large. By virtue of the variable gear ratio, the amount of axial displacement of the rack 33 per one complete turn of the pinion 31 (i.e., the steering wheel 21) is made variable inversely with the steering angle. It is, therefore, possible to reduce the amount of displacement of the housing per single revolution of the steering wheel, correspondingly. Thus, in spite of a limited amount of displacement of the pinion, the steering ratio can be controlled with extended controllable range.

The assist torque mechanism 40 is provided at option. The actuators 52, 252 should by no means be limited to an electric motor as in the illustrated embodiments but may include a hydraulic motor, linear motor, pneumatic cylinder, hydraulic cylinder, electric cylinder, solenoid and so on. Although in the illustrated embodiment the steering systems 10, 200 are of the "end takeoff" type, a center takeoff type steering system can be used. Furthermore, the power transmission mechanisms 70, 270 comprising a set of hypoid gears having a self-locking function may be replaced with a worm gear mechanism composed of a worm mounted to the actuator and a worm wheel coupled to a load. In this instance, the reverse power transmission efficiency of the worm gear mechanism is determined such that the actuator is able to keep the standstill state against the force applied from the load side. Additionally, the pinion 31 in the second embodiment shown in FIG. 7 may be mounted to the housing 235 such that the pinion is movable in a direction parallel to the axis of the rack 33.

The present disclosure relates to the subject matter of Japanese Patent Application No. 2000-365530, filed Nov. 30, 2000, the disclosure of which is expressly incorporated herein by reference in its entirety.

What is claimed is:

1. A vehicle steering system comprising;
   a steering wheel;
   a rack and pinion mechanism having a pinion functionally coupled to the steering wheel and a rack meshing with the pinion and functionally coupled to steerable wheels;
   a housing accommodating within it the rack and pinion mechanism; and
   means for displacing the rack in the axial direction thereof to steer the steerable wheels independently of steering operation initiated by the steering wheel,
   wherein the rack and pinion mechanism comprises a variable gear ratio rack and pinion mechanism having a variable gear ratio, which is the lowest when the steering wheel is in a neutral position and becomes higher as the steering angle of the steering wheel becomes large.

2. The vehicle steering system according to claim 1, wherein the rack has a first region generally corresponding in position to the neutral position of the steering wheel, and a second region extending contiguously from the first region in one direction along the axis of the rack, the first region has a fixed tooth pitch, and the second region has a variable tooth pitch smaller than the fixed pitch of the first region and reducing progressively in a direction from the first region toward an end of the second region opposite from the first region.

3. The vehicle steering system according to claim 2, wherein the rack further has a third region extending from the end of the second region along the axis of the rack and generally corresponding in position to an end portion of an available range of the steering angles located remote from the neutral position, the third region having a fixed tooth pitch smaller than that of the second region.

4. The vehicle steering system according to claim 1, wherein the means for displacing the rack comprises:
   support means for supporting the housing on a vehicle body such that the housing is displaceable relative to the vehicle body in the widthwise direction of the vehicle body; and
   an actuator functionally coupled to the housing and operating to displace the housing relative to the vehicle body in the widthwise direction of the vehicle body, thereby causing the rack to move together with the housing in the widthwise direction of the vehicle body.

5. The vehicle steering system according to claim 4, wherein the support means comprises a link mechanism interconnecting the housing and the vehicle body such that the link mechanism together with the housing and a part of the vehicle body forms a quadric parallel linkage, and the actuator has an output portion operatively connected to the link mechanism.

6. The vehicle steering system according to claim 5, wherein the means for displacing the rack further comprises a power transmitting mechanism disposed between the link mechanism and the actuator for transmitting power from the actuator to the link mechanism, the power transmission mechanism comprising a hypoid gear mechanism having a small gear connected to the output portion of the actuator and a large gear meshing with the small gear, and a drive link having one end pivotally connected to the link mechanism and the opposite end pivotally connected to the large gear in eccentric relation to the large gear.

7. The vehicle steering system according to claim 1, wherein the means for displacing the rack comprises:
   support means for supporting the pinion within the housing such that the pinion is displaceable in the axial direction of the rack; and
   an actuator functionally coupled to the pinion and operating to displace the pinion in the axial direction of the rack, thereby causing the rack to move together with the pinion in the axial direction thereof.

8. The vehicle steering system according to claim 7, wherein the support means comprises a swing arm pivotally connected at one end to the housing and rotatably supporting thereon the pinion, the swing arm extending transversely across the rack, and the actuator is mounted to the housing and has an output portion operatively connected to a free end of the swing arm.

9. The vehicle steering system according to claim 8, wherein the means for displacing the rack further comprises a power transmitting mechanism disposed between the swing arm and the actuator for transmitting power from the actuator to the owing arm, the power transmission mechanism comprising a hypoid gear mechanism having a small gear connected to the output portion of the actuator and a large gear meshing with the small gear, and a drive link having one end pivotally connected to the free end of the swing arm and the opposite end pivotally connected to the large gear in eccentric relation to the large gear.

10. The vehicle steering system according to claim 8, wherein the swing arm has a hollow structure having an internal space formed therein, the rack extending through the hollow space of the swing arm.

* * * * *